(12) United States Patent
Ellison et al.

(10) Patent No.: US 8,046,593 B2
(45) Date of Patent: Oct. 25, 2011

(54) STORAGE DEVICE CONTROLLED ACCESS

(75) Inventors: Carl M. Ellison, Seattle, WA (US);
Jamie Hunter, Bothell, WA (US);
Kenneth D. Ray, Seattle, WA (US);
Niels T. Ferguson, Redmond, WA (US);
Philip J. Lafornara, Bellevue, WA (US); Russell Humphries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1174 days.

(21) Appl. No.: 11/449,553

(22) Filed: Jun. 7, 2006

(65) Prior Publication Data

US 2008/0022132 A1    Jan. 24, 2008

(51) Int. Cl.
*G06F 12/14* (2006.01)
(52) U.S. Cl. ............ 713/193; 713/189; 726/26; 726/27; 726/31
(58) Field of Classification Search ........................ None
See application file for complete search history.

(56) References Cited

U.S. PATENT DOCUMENTS

| 7,162,645 | B2 * | 1/2007 | Iguchi et al. | 713/193 |
| 7,434,069 | B2 * | 10/2008 | Nessler | 713/193 |
| 2005/0018472 | A1 * | 1/2005 | Lim | 365/154 |

OTHER PUBLICATIONS

U.S. Appl. No. 11/031,161, filed Jan. 7, 2005, Hunter, J. et al.
U.S. Appl. No. 11/035,715, filed Jan. 14, 2005, Hunter, J. et al.

* cited by examiner

*Primary Examiner* — Pramila Parthasarathy
(74) *Attorney, Agent, or Firm* — Woodcock Washburn LLP (57) ABSTRACT

Access to a storage device, such as a disk, is controlled by performing a disk operation using a single cryptographic engine. Keys associated with each layer of a layered structure associated with controlling access to the storage device are combined. The resultant of this combination is used as the key to the cryptographic engine. Data to be retrieved from and written to the storage device are operated on by the cryptographic engine utilizing the combined key. Keys are combined by combining functions associated with layers of the layered structure. A combining function can include an exclusive or function, a cryptographic hash function, or a combination thereof.

18 Claims, 5 Drawing Sheets

STORAGE DEVICE CONTROLLED ACCESS

TECHNICAL FIELD

The technical field generally relates to computer processing and more specifically to controlling access to a storage device.

BACKGROUND

Current storage devices typically store data in a hierarchical layered structure. For example, a disk typically is accessed through layers, wherein each layer implements a respective abstraction. A disk operates on sectors and groups of sectors. Disk sectors are grouped into partitions having one or more partition per disk. Partitions are grouped into volumes, wherein a volume can contain partitions from different disks. Files typically comprise sectors from a volume.

To encrypt, or decrypt, data on a disk, current systems perform encryption, or decryption, at multiple layers. For example, to gain access to data stored in a file within a volume on a disk, encryption/decryption may be performed at the volume layer and then at the file layer. Encryption can also be performed within a file on data not having an integral number of sectors. Performing multiple encryption/decryption operations each time the disk is accessed results in detrimental performance such as slower system performance and limited utilization of system resources.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

To control access to a storage device, keys, such as cryptographic keys, are used. In an example embodiment, the keys are combined to form a composite key, and the resulting composite key is used to perform encryption/decryption. Keys are combined using a key combining function and encryption/decryption is performed using a keyed transformation function. For example, if respective keys are needed at a volume layer and at a file layer to access data on a storage device, the volume key is combined with the file key for a given sector, using a key combining function. The resultant key is used to perform encryption/decryption using a keyed transformation function. Thus, encryption/decryption is not performed at each layer. Instead, a more efficient key combining operation is performed at the designated layers. In example implementations, the key combining function can comprise an EXCLUSIVE-OR function or a cryptographic hash function, or any other appropriate key combination function, utilizing knowledge of all the input keys. The keyed transformation function can comprise, for example, an encryption/decryption function implemented in accordance with the Advanced Encryption Standard (AES), an authentication function such as a keyed-hash message authentication code (HMAC), or any other keyed function. The cipher text that results from encryption using the result of the key combining function is not the same as the cipher text that is the result of iterative encryptions using the individual keys; however the semantics associated with access to the cipher text is the same. That is, as long as the key combination function is not flawed, if there is access to all the keys involved, then there will be access to the plaintext in either architecture, but if any of the keys is unavailable, then there will be no access to the plaintext, in either architecture.

BRIEF DESCRIPTION OF THE DRAWINGS

The foregoing summary, as well as the following detailed description, are better understood when read in conjunction with the appended drawings. For the purpose of illustrating controlled access to a storage device, there is shown in the drawings exemplary constructions thereof; however, controlling access to a storage device is not limited to the specific methods and instrumentalities disclosed.

DETAILED DESCRIPTION OF ILLUSTRATIVE EMBODIMENTS

Figure 1:
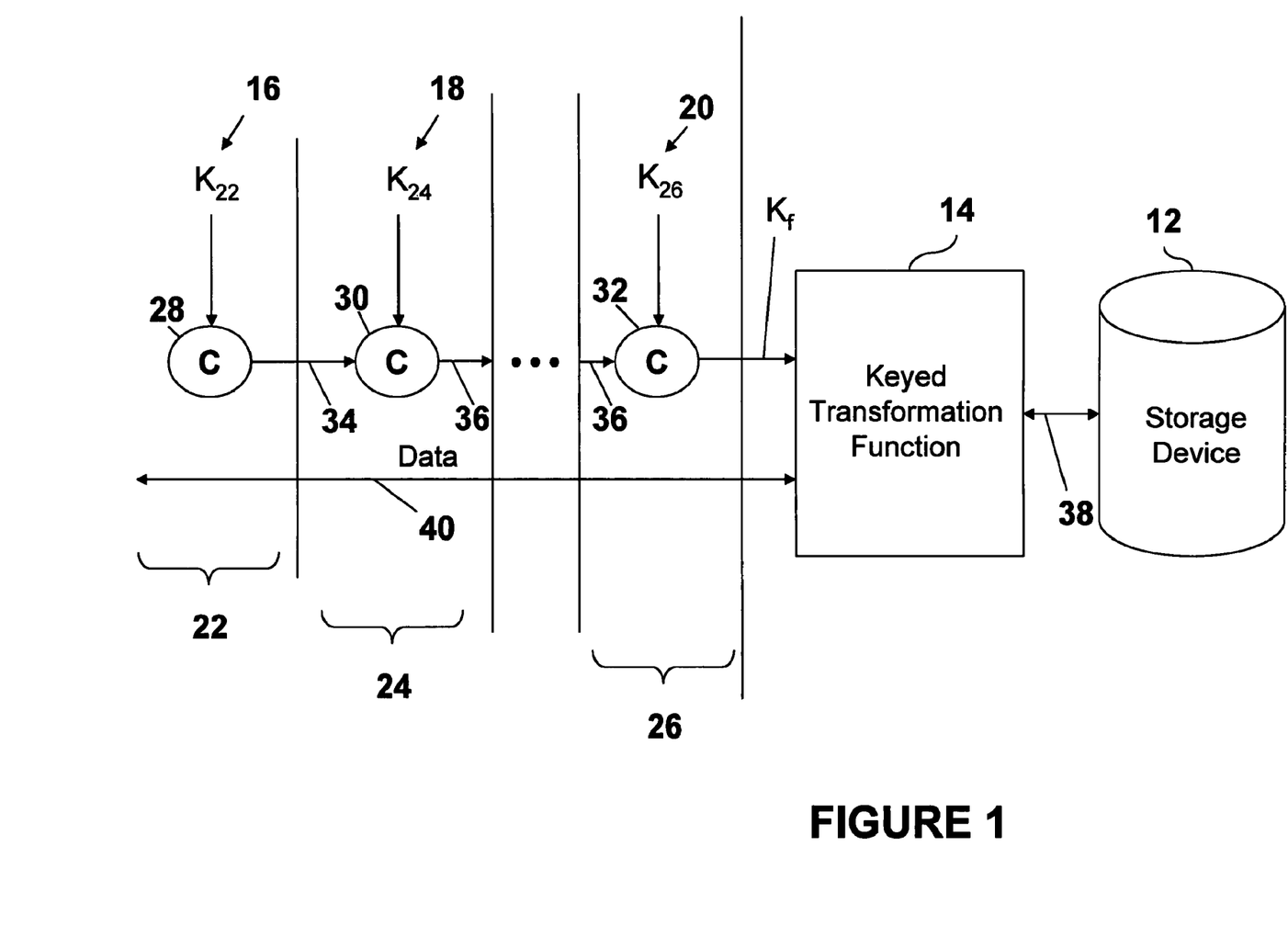
FIG. 1 is a depiction of an example system for controlling access to a storage device.

FIG. 1 is a depiction of an example system for controlling access to a storage device comprising a storage device 12, a keyed transformation function 14, multiple layers 22, 24, 26, and combining functions 28, 30, 32. The storage device 12 can comprise any appropriate storage device, for example, a magnetic cassette, a magnetic tape, magnetic disk storage or other magnetic storage device, a CD-ROM, digital versatile disks (DVD) or other optical storage device, random-access memory (RAM), read-only memory (ROM), programmable read-only memory (PROM), erasable PROM (EPROM), electrically EPROM (EEPROM), flash memory, universal serial bus (USB) compatible memory, smart cards, or other memory technology, or any other medium which can be used to store information and which can be accessed. As described herein, access includes writing, reading, or a combination thereof.

The keyed transformation function 14 can comprise any appropriate keyed transformation function, for example, a cryptographic engine, a symmetric key cryptographic function, a cryptographic function in accordance with the Advanced Encryption Standard (AES), or the like. A cryptographic engine can comprise for example, code, data, objects, methods and/or routines comprising a single or numerous programmatic functions and/or structures that are utilized to complete a task and/or set of tasks.

The layers 22, 24, and 26, are representative of any appropriate number of layers that can be used to control access to the storage device 12. The layers can be structured hierarchically. For example, layer 22 can represent a file layer, layer 24 can represent a volume layer, and layer 26 can represent a partition layer. It is to be understood that these layers are representative of any layered structure that can be implemented to control access to the storage device 12.

Access to the storage device 12 is controllable using keys associated with each layer. As depicted in FIG. 1, key $K_{22}$ is associated with layer 22, key $K_{24}$ is associated with layer 24, and key $K_{26}$ is associated with layer 26. Data associated with the layer 22 are accessible using the key $K_{22}$. Data associated with the layer 24 are accessible using the key $K_{24}$. Data associated with the layer 26 are accessible using the key $K_{26}$. In a hierarchical layered structure, for example, if layer 22 represents a file layer, layer 24 represents a volume layer, and layer 26 represents a partition layer, the keys for all layers are needed to access the lowest level data. Thus, to access data associated with the file layer 22, the keys for the file layer 22, the volume layer 24, and the partition layer 26 are needed.

A combining function associated with a layer operates on provided keys to generate a resultant key. The resultant key is provided to the appropriate key input at the next layer in the sequence. In an example embodiment, the key input at a given layer and another key associated with the respective layer are combined to generate the key to provide to the key input at the next layer. This continues until the end of the sequence, at which point a final key is generated. It is the final key that is provided to the keyed transformation function 14 to access the storage device 12. For example, key, $K_{22}$ is provided to the combining function 28. The key, $K_{22}$ is operated on by the combining function 28 and the result 34 is provided to the combining function 30. The key $K_{24}$ is provided to the combining function 30. The combining function 30 operates on the resultant key 34 and the key $K_{24}$ to generate a resultant key 36. The resultant key 36 is provided to the combining function 32. The combining function 32 operates on the resultant key 36 and the key $K_{26}$ to generate the final key $K_f$. The final key, $K_f$, is provided to the keyed transformation function 14. The transformation function 14 operates on either the data 38 or the data 40 utilizing the final key, $K_f$, to access the storage device 12. If data is to be written to the storage device 12, the keyed transformation function 14 operates on the data 40 utilizing the final key, $K_f$, and provides the resultant data to the storage device 12 for storage thereon. If data is to be read from the storage device 12, the keyed transformation function 14 operates on the data 38 utilizing the final key, $K_f$.

Figure 2:
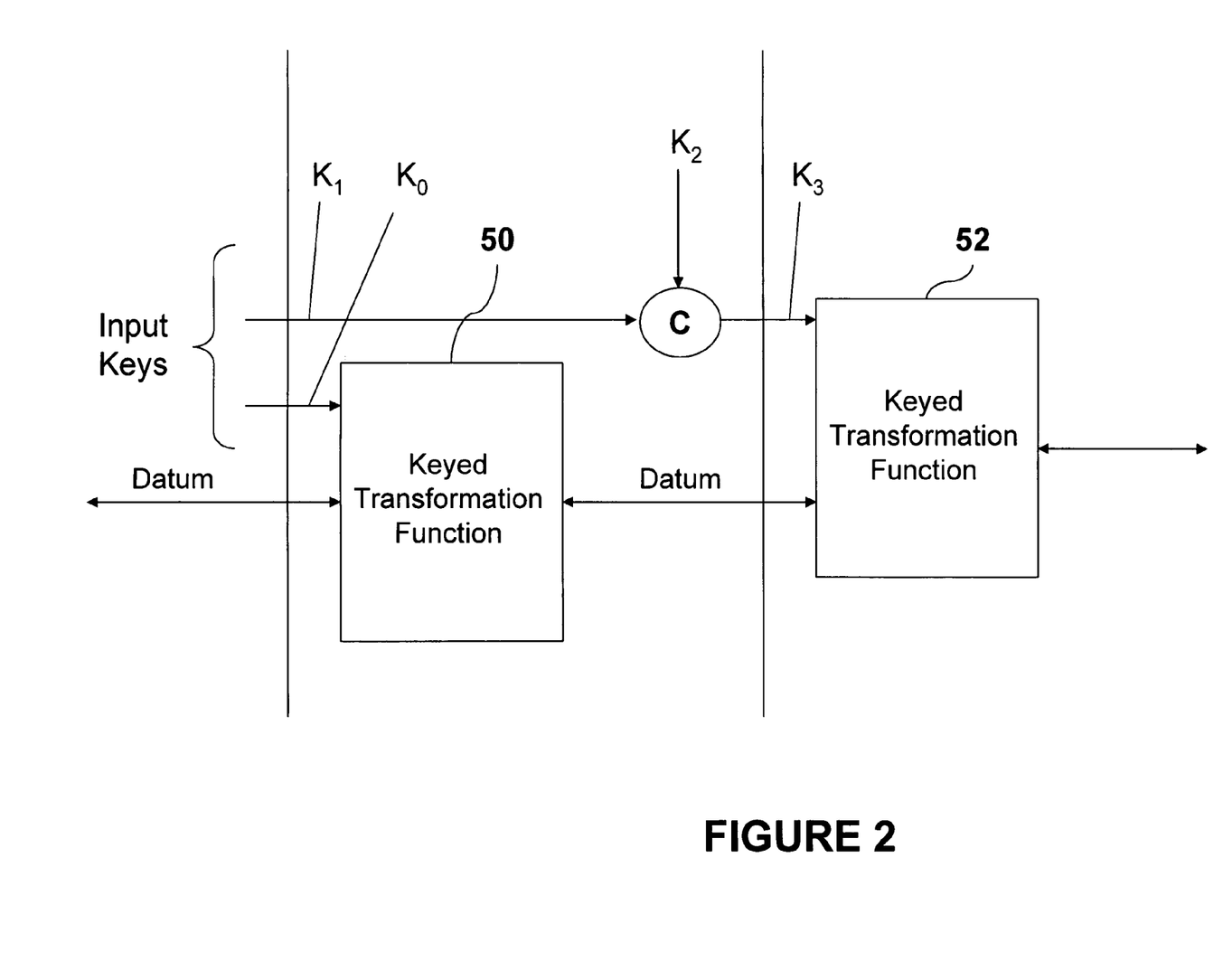
FIG. 2 is an example depiction of multiple transformation functions with multiple chains of keys.

It is emphasized that FIG. 1 exemplary. FIG. 1 depicts one sequence of key combination functions and one keyed transformation function, however, any number of keys and keyed transformation functions are applicable, and those functions can be at the same or different layers of the storage abstraction. For example, FIG. 2 shows two layers, each with its own keyed transformation function 50, 52. Two separate keyed transformation functions are shown, but any number can be employed. In an example embodiment, one transformation function 50 encrypts data and another transformation function 52 computes an integrity check (such as a Message Authentication Code). The encryption functions are represented by one encryption engine 52 using a key, $K_0$, derived from multiple keys at different layers, and the authentication engine 50 can be employed at a different layer using different keys. At the left layer, there are two input keys, $K_0$ and $K_1$, and one datum. At the input to the right layer, there is one key input, $K_3$, and one datum, because the keyed transformation function, 50, has consumed one of those keys. Although not depicted in FIG. 2, the transformation functions can be applied at any layer(s) and more than one transformation function can be applied in the same layer. FIG. 2 illustrates that a keyed encryption engine consumes a key and therefore reduces the number of keys exposed as parameters into a layer. Each of these parameters can be communicated into that layer by known programming means, such as passing a parameter to an application programming interface (API) or a state variable associated with that layer, for example.

In an example embodiment, the keyed transformation function comprises a cryptographic engine for performing encryption and decryption. Thus, if data is to be written to the storage device 12, the keyed transformation function 14 encrypts the data 40 utilizing the final key, $K_f$, and provides the encrypted data to the storage device 12 for storage thereon. If data is to be read from the storage device 12, the keyed transformation function 14 decrypts encrypted data 38 utilizing the final key, $K_f$.

The combining function can comprise any appropriate combining function. For example, the combing function can comprise an exclusive or (XOR) function, wherein the key, or keys, provided to the combining function are XOR'd, and the resultant key is indicative thereof. In another example embodiment, the combining function can comprise a cryptographic hash function, wherein the key, or keys, provided to the combining function are cryptographically hashed, and the resultant key is indicative thereof. Any appropriate cryptographic hash function can be used, such as the well known SHA-1 or SHA-256 cryptographic hash functions, for example. In yet another example embodiment, the combining functions can comprise a combination of XOR functions and cryptographic hash functions.

If at any layer, there is no key added at that layer, then a key provided as input to the layer, is passed through to the output of the layer (the input to the next layer), unchanged.

Figure 3:
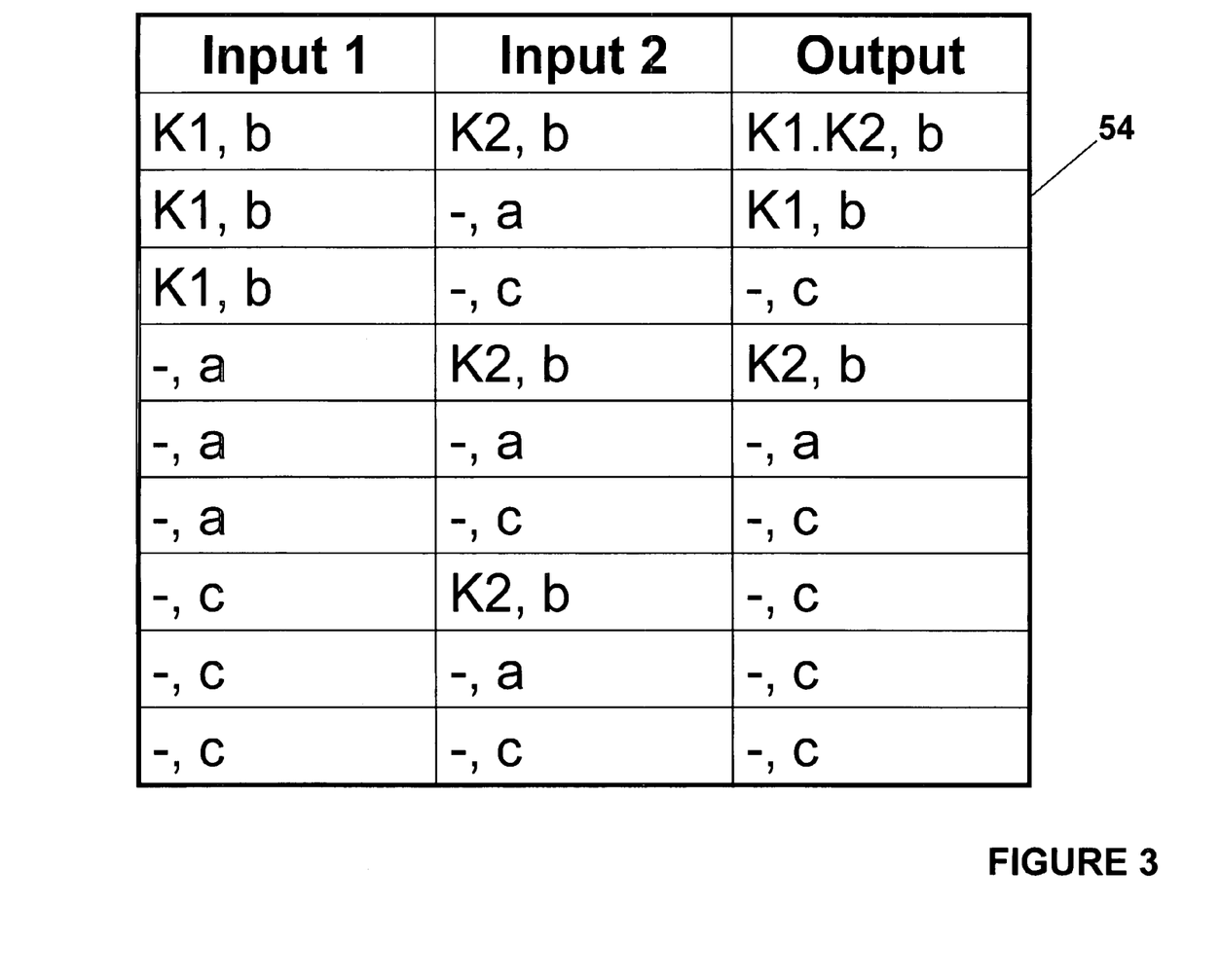
FIG. 3 is an example state table for a combining function.

FIG. 3 depicts an example state table 54 for a combining function having two inputs, input 1 and input 2, and one output, each depicted in a respective column of the table 54. The table 54 illustrates how an example key structure is combined. In an example embodiment, a key can be represented as at least a two component structure, one of which is a cryptographic key and the other of which is a state indicator. In the table 54 the letters a, b, and c are indicative of respective state indicators. The letter "a" indicates that no key is yet specified. The letter "b" indicates there is a key. The letter "c" indicates that there is to be no key for this operation even if some key is offered at an intermediate layer. Thus, if either input in a row depicts a state of "c," the output is state "c" with no key. If either input in a row depicts a state "a" and the other input is "b," the output is state "b" with a combined key as appropriate. If both inputs are state "b," the output is "b." The construct K1·K2 in the output column of the table 54 is indicative of the combination of the two keys, K1 and K2. Each row of the table 54 depicts various combinations of inputs and the resulting output. For example, the first row of the table 54 shows key, K1 and state "b" as the input 1 and key, K2, and state "b" as input 2 The output is shown as the combination of the keys K1 and K2, K1·K2, and the state "b." As seen in table 54, a single key is passed through to the output, and multiple keys are combined.

Figure 4:
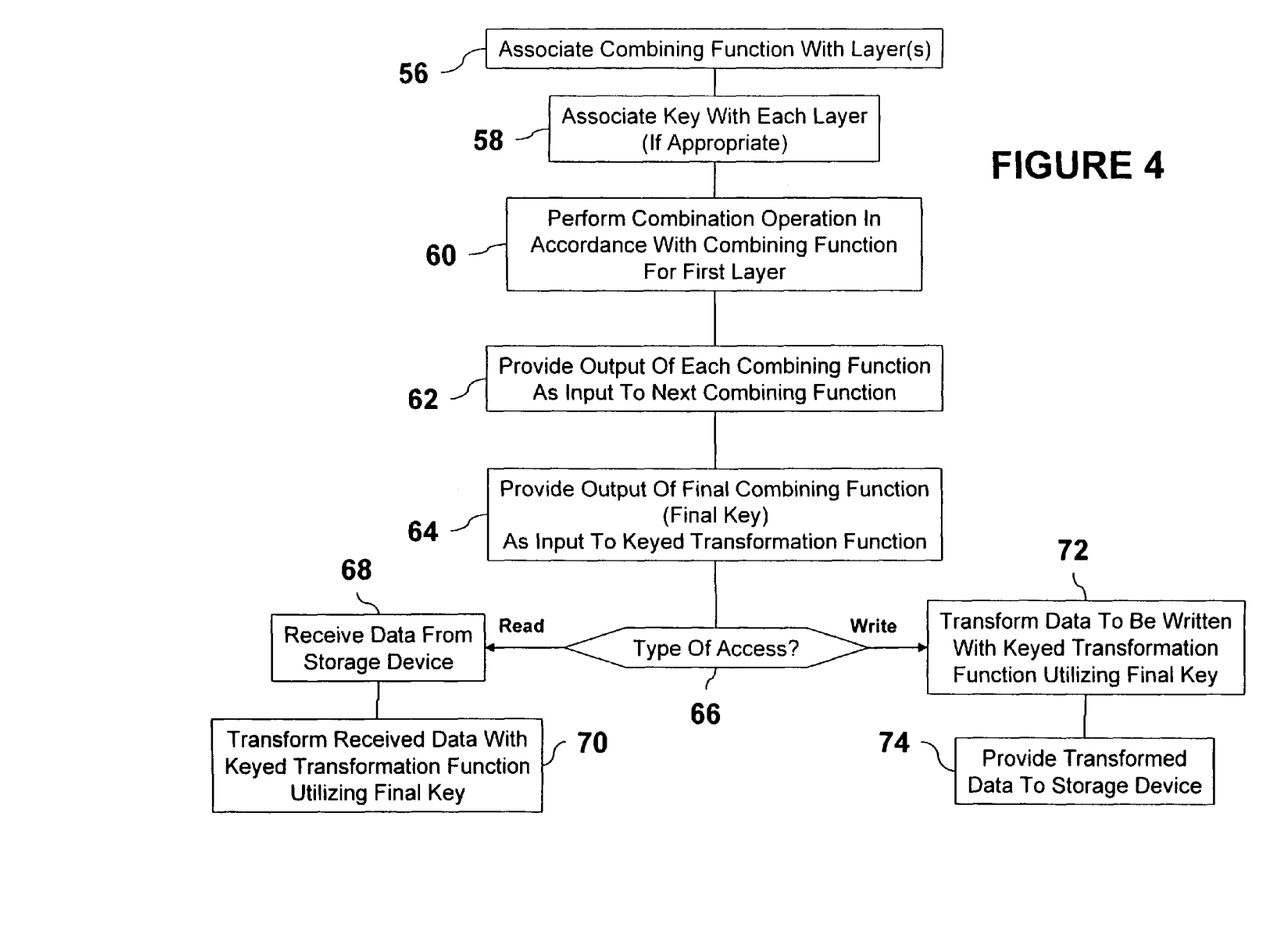
FIG. 4 is a flow diagram of an example process for controlling access to a storage device.

FIG. 4 is a flow diagram of an example process for controlling access to a storage device. Combining functions are associated with layers at step 56. Layers, as described above, refer to the layered structure that can be implemented to control access to the storage device. Any or all layers can have associated combination functions. Keys are associated with layers at step 58. Any or all layers can have associated keys. At step 60, the combining function operation associated with the first layer is performed. As described above, the combining function can combine all keys provided as input, or combine no keys provided as input, dependent upon the arguments provided to the combining function. In an example embodiment, a command argument is indicative of the functionality of the combining function.

In sequence, the output of a combining function is provided as input to the next combining function at step 62. This continues until the last combining function in the sequence is reached. The output of the last sequence, denoted as the final key, is provided to the keyed transformation function at step 64. The keyed transformation function can comprise any appropriate function capable of transforming data provided thereto in accordance with a key. Example keyed transformation functions include cryptographic functions, symmetric key cryptographic functions, and cryptographic functions implemented in accordance with the AES, for example. Those keyed transformation functions can be used for encryption/decryption, integrity verification such as with a Message Authentication Code (MAC), a function that combines encryption/decryption with integrity verification in one operation, scrambling over a large region of storage, or any other keyed transformation function.

The type of access is determined at step 66. If data is to be written to the storage device (step 66), the data provided to the keyed transformation function is transformed utilizing the final key at step 72. The transformed data is provided to the storage device at step 74. If data is to be read from the storage device (step 66), the data is received from the storage device at step 68. The received data is transformed by the keyed transformation function utilizing the final key at step 70.

Figure 5:
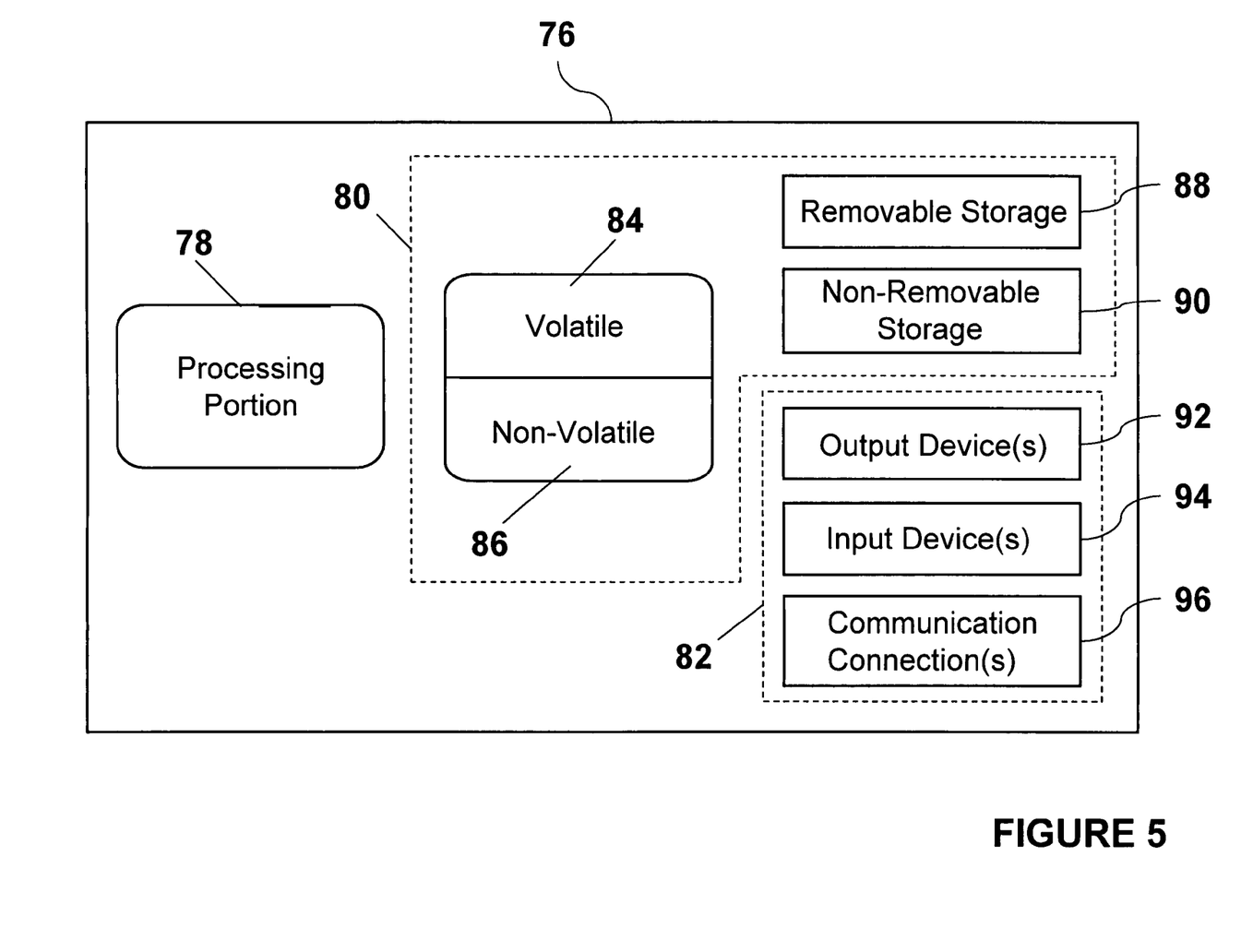
FIG. 5 is a diagram of an exemplary computing device for controlling access to a storage device.

FIG. 5 is a diagram of an exemplary computing device 76 for controlling access to a storage device. The computing device 76 can be implemented as a client processor and/or a server processor. The computing device 76 comprises a processing portion 78, a memory portion 80, and an input/output portion 82. The processing portion 78, memory portion 80, and input/output portion 82 are coupled together (coupling not shown in FIG. 5) to allow communications therebetween. The processing portion 78 is capable of performing cryptographic processing, such as encryption and decryption, for example. The processing portion 78 is capable of performing the operations associated with controlling access to a storage device. For example, the processing portion 78 is capable of associating combining functions with respective layers, associating keys with respective layers, combining keys, and controlling access to the storage device in accordance with the keyed transformation function utilizing the final key. The memory portion 80 is capable of storing all parameters associated with controlling access to the storage device, such as keys combining function command arguments, for example. The memory portion 80, or any portion thereof, can be the storage device having controlled access thereto. Input/output portion 82 is capable of providing and/or receiving components utilized to implement controlled access to the storage device.

Depending upon the exact configuration and type of processor, the memory portion 80 can be volatile (such as RAM and/or cache) 84, non-volatile (such as ROM, flash memory, etc.) 86, or a combination thereof. The computing device 76 can have additional features/functionality. For example, the computing device 76 can include additional storage (removable storage 88 and/or non-removable storage 90) including, but not limited to, magnetic or optical disks, tape, flash, smart cards or a combination thereof. Computer storage media, such as memory portion 80, 84, 86, 88, and 90, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 76. Any such computer storage media can be part of the computing device 76.

The computing device 76 also can contain communications connection(s) 96 that allow the computing device 76 to communicate with other devices, such as a storage device having controlled access, for example. Communications connection(s) 96 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 76 also can have input device(s) 94 such as keyboard, mouse, pen, voice input device, touch input device, etc. Output device(s) 92 such as a display, speakers, printer, etc. also can be included.

The various techniques described herein can be implemented in connection with hardware or software or, where appropriate, with a combination of both. Thus, the methods and apparatuses for controlling access to a storage device or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for controlling access to a storage device.

The program(s) can be implemented in assembly or machine language, if desired. In any case, the language can be a compiled or interpreted language, and combined with hardware implementations. The methods and apparatuses for controlling access to a storage device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for controlling access to a storage device. When implemented on a general-purpose processor, the program code combines with the processor to provide a unique apparatus that operates to invoke the functionality of controlled access to a storage device. Additionally, any storage techniques used in connection with controlling access to a storage device can invariably be a combination of hardware and software.

While controlled access to a storage device has been described in connection with the example embodiments of the various figures, it is to be understood that other similar embodiments can be used or modifications and additions can be made to the described embodiments for performing the same functions controlling access to a storage device without deviating therefrom. Therefore, controlling access to a storage device as described herein should not be limited to any single embodiment, but rather should be construed in breadth and scope in accordance with the appended claims.

What is claimed is:

1. A method for controlling access to a storage device, the method comprising;
   providing a storage device, wherein data stored on the storage device is capable of being accessed in accordance with a layered structure comprising a plurality of layers;

associating at least a first key and a second key with a first layer and a second layer, respectively, of the plurality of layers of the layered structure;

generating a final key indicative of a combination of at least the first and second keys associated with the first and second layers;

controlling access to the storage device in accordance with a keyed transformation function and the final key;

associating a key combining function with each layer having an associated key;

in accordance with a predetermined sequence:

for each associated key combining function having a next key combining function in the sequence, providing a respective key combining function output as an input to a next key combining function in the sequence; and for a final key combining function indicative of an associated key combining function, not having a next key combining function in the sequence, providing the final key, indicative of an output of the final key combining function, to the keyed transformation function; and performing one of:

providing to the storage device, data transformed with the keyed transformation function in accordance with the final key; and transforming, with the keyed transformation function in accordance with the final key, data received from the storage device.

2. A method in accordance with claim 1, wherein:

the layered structure comprises a hierarchical layered structure; and the predetermined sequence is in accordance with a hierarchy of the hierarchical layered structure.

3. A method in accordance with claim 1, wherein a key combining function is capable of:

receiving as input at least one of:

a command; and at least one key; and providing the key combining function output determined in accordance with the input.

4. A method in accordance with claim 3, wherein the command is indicative of one of:

performing a transformation operation; and performing a transformation operation upon request from a layer of the layered structure.

5. A method in accordance with claim 1, wherein a key combining function is capable of combining keys provided as input thereto.

6. A method in accordance with claim 1, wherein a key combining function is capable of cryptographically combining keys provided as input thereto utilizing knowledge of all keys provided as input.

7. A method in accordance with claim 1, wherein the keyed transformation function comprises a cryptographic transformation function.

8. A system for controlling access to a storage device, wherein data stored on the storage device is capable of being accessed in accordance with a layered structure comprising a plurality of layers, the system comprising:

a processing portion for:

associating a first key and a second key with a first layer and a second layer, respectively, of the plurality of layers of the layered structure;

generating a final key indicative of a combination of at least the first and second keys associated with the first and second layers; and controlling access to the storage device in accordance with a keyed transformation function and the final key;

associating a key combining function with each layer having an associated key; and in accordance with a predetermined sequence:

for each associated key combining function having a next key combining function in the sequence, providing a respective key combining function output as an input to a next key combining function in the sequence; and for a final key combining function indicative of an associated key combining function not having a next key combining function in the sequence, providing the final key, indicative of an output of the final key combining function, to the keyed transformation function;

transforming with the keyed transformation function in accordance with the final key, data for storage on the storage device; and transforming with the keyed transformation function in accordance with the final key, data received from the storage device; and a memory portion for storing each associated respective key; and an input/output portion for:

accessing the storage device;

providing transformed data to the storage device; and receiving data from the storage device.

9. A system in accordance with claim 8, wherein:

the layered structure comprises a hierarchical layered structure; and the predetermined sequence is in accordance with a hierarchy of the hierarchical layered structure.

10. A system in accordance with claim 8, wherein the key combining function is capable of:

receiving as input at least one of:

a command; and at least one key; and providing the key combining function output determined in accordance with the input.

11. A system in accordance with claim 10, wherein the command is indicative of one of:

performing a transformation operation; and performing a transformation operation upon request from a layer of the layered structure.

12. A system in accordance with claim 8, wherein a key combining function is capable of combining keys provided as input to the key combining function.

13. A system in accordance with claim 8, wherein the key combining function is capable of cryptographically combining the keys provided as input thereto utilizing knowledge of all keys provided as input.

14. A system in accordance with claim 8, wherein the keyed transformation function comprises a cryptographic transformation function.

15. A computer-readable storage medium, the computer-readable storage medium not being a transient signal, the computer-readable storage medium having computer-executable instructions stored thereon for controlling access to a storage device, wherein data stored on the storage device is capable of being accessed in accordance with a layered structure comprising at least one layer, the instructions for performing the acts of:

associating a respective key with at least one of the at least one layer of the layered structure;

generating a final key indicative of a combination of the at least one respective key associated with the at least one layer;

associating a key combining function with each one of the at least one layer having a respective associated key;

in accordance with a predetermined sequence:

for each associated key combining function having a next key combining function in the sequence, providing a respective key combining function output as an input to a next key combining function in the sequence; and for a final key combining function indicative of an associated key combining function not having a next key combining function in the sequence, providing the final key, indicative of an output of the final key combining function, to the keyed transformation function; and performing one of:

providing to the storage device, data transformed with a keyed transformation function in accordance with the final key; and transforming, with the keyed transformation function in accordance with the final key, data received from the storage device.

16. A computer-readable storage medium in accordance with claim 15, wherein:

the layered structure comprises a hierarchical layered structure; and the predetermined sequence is in accordance with a hierarchy of the hierarchical layered structure.

17. A computer-readable storage medium in accordance with claim 15, wherein the key combining function is capable of:

receiving as input at least one of:

a command indicative of one of:

performing a transformation operation; and performing a transformation operation upon request from a layer of the layered structure; and at least one key; and providing the key combining function output determined in accordance with the input.

18. A computer-readable storage medium in accordance with claim 15, wherein a key combining function is capable of at least one of:

combining keys provided as input thereto; and cryptographically combining keys provided as input thereto utilizing knowledge of all keys provided as input.

* * * * *